(12) United States Patent
Hisada

(10) Patent No.: US 9,187,072 B2
(45) Date of Patent: Nov. 17, 2015

(54) SHAFT SEALING APPARATUS, PUMP APPARATUS AND BRAKE HYDRAULIC PRESSURE CONTROL DEVICE USING SAME

(75) Inventor: Yoshitake Hisada, Kariya (JP)

(73) Assignee: ADVICS CO., LTD., Kariya-Shi, Aichi-Ken (JP)

( * ) Notice: Subject to any disclaimer, the term of this patent is extended or adjusted under 35 U.S.C. 154(b) by 686 days.

(21) Appl. No.: 13/249,683

(22) Filed: Sep. 30, 2011

(65) Prior Publication Data

US 2012/0080936 A1    Apr. 5, 2012

(30) Foreign Application Priority Data

Sep. 30, 2010 (JP) .................................. 2010-220552

(51) Int. Cl.
| | |
|---|---|
| *B60T 8/40* | (2006.01) |
| *B60T 11/236* | (2006.01) |
| *F16J 15/32* | (2006.01) |
| *F16J 9/24* | (2006.01) |

(Continued)

(52) U.S. Cl.
CPC ............ *B60T 11/236* (2013.01); *F16J 15/3208* (2013.01); *B60T 8/4031* (2013.01); *F04C 2/10* (2013.01); *F16J 9/24* (2013.01); *F16J 15/346* (2013.01)

(58) Field of Classification Search
CPC ....... B60T 8/4031; F04C 15/0038; F16J 9/24; F16J 15/34; F16J 15/3436; F16J 15/346
USPC .................... 303/10–11, 116.4; 384/906, 138; 277/584, 372–373
See application file for complete search history.

(56) References Cited

U.S. PATENT DOCUMENTS

| | | | |
|---|---|---|---|
| 4,729,569 A | * | 3/1988 | Muller et al. .................. 277/584 |
| 7,770,898 B2 | * | 8/2010 | Dietle et al. .................... 277/559 |

(Continued)

FOREIGN PATENT DOCUMENTS

| | | | |
|---|---|---|---|
| CN | 1959115 A | | 5/2007 |
| EP | 170928 A | * | 2/1986 |

(Continued)

OTHER PUBLICATIONS

Office Action with Search Report issued on Nov. 26, 2014, by the China Patent Office in corresponding Chinese Patent Application No. 201110293829.1, and an English Translation of the Office Action and Search Report (17 pages).

*Primary Examiner* — Bradley King
(74) *Attorney, Agent, or Firm* — Buchanan Ingersoll & Rooney PC

(57) ABSTRACT

A shaft sealing device comprising: a first member; a second member provided with a through-hole through which the first member passes; a sealing member configured to seal a gap between the through-hole and the first member; a rotation restricting part restricting relative rotation between the first and second members; and an axial displacement restricting part restricting the axial displacement of the sealing member. The rotation restricting part includes a first contact portion provided on the first member, a second contact portion provided on the sealing member and an inclined surface included on the first contact portion. The axial displacement restricting part includes a stopper surface. When the sealing member rotates in one direction relative to the second member by being dragged by the first member, the sealing member contacts the stopper surface to restrict the axial displacement of the sealing member.

5 Claims, 9 Drawing Sheets

(51) Int. Cl.
*F16J 15/34* (2006.01)
*F04C 2/10* (2006.01)

(56) References Cited

U.S. PATENT DOCUMENTS

2007/0096550 A1  5/2007  Yamaguchi et al.
2007/0205563 A1  9/2007  Dietle et al.
2007/0231177 A1  10/2007  Yamaguchi et al.

FOREIGN PATENT DOCUMENTS

JP  04136363 U  12/1992
JP  2007-278086 A  10/2007

* cited by examiner

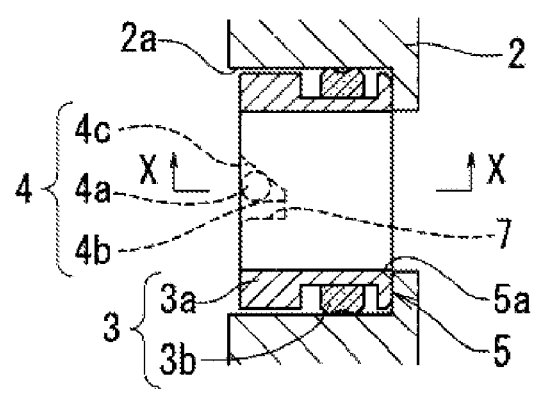 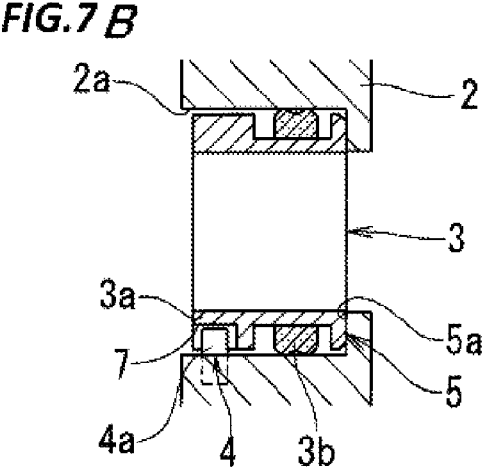

SHAFT SEALING APPARATUS, PUMP APPARATUS AND BRAKE HYDRAULIC PRESSURE CONTROL DEVICE USING SAME

BACKGROUND

The present invention relates to a shaft sealing apparatus suitable for sealing a gap between two members which rotate relative to each other, for example, a gap between a rotation shaft and a member through which the rotation shaft passes, and a pump apparatus and a brake hydraulic pressure control device for a vehicle using the shaft sealing apparatus.

As a power driven pump used in the brake hydraulic pressure control device, for example, there is a pump disclosed in JP2007-278086A. This pump employs a well-known inner gear pump.

The pump disclosed in JP2007-278086A is driven by the rotation shaft and configured to perform a double-sealing operation using a first seal part constituted by a shaft sealing apparatus and a second seal part constituted by an oil seal in order to prevent introduced brake fluid from being leaked to the outside. In this case, the first seal part is considered to be used when a pressure is applied to an inner liquid chamber and permits micro-leakage.

The brake fluid leaked through the first seal part is collected in an intermediate chamber formed between the first seal part and the second seal part. The oil seal of the second seal part is adapted to prevent the collected brake fluid from being leaked from the intermediate chamber.

Further, the shaft sealing apparatus constituting the first seal part is incorporated in a plug which closes an opening of the pump accommodation chamber. In addition, the shaft sealing apparatus is rotationally locked so that it can be prevented from co-rotating with the rotation shaft which is used for driving the pump and passes through the plug.

SUMMARY

In the sealing structure disclosed in JP2007-278086A, as illustrated in FIG. 12, a rotation locking pin 43 is provided on a plug 44 and engaged with a notch portion 42 which is formed on a sealing member 41, thereby locking a rotation of the shaft sealing apparatus.

However, in the above structure, an axial gap g is essentially occurred between the notch portion 42 and the rotation locking pin 43 and the sealing member 41 is allowed to move axially in a range of the gap. Accordingly, as a pressure is applied on the suction chamber of the pump which is sealed by the first seal part, the sealing member 41 can move toward the intermediate chamber. As a result, the volume of the intermediate chamber shrinks and thus the pressure of the intermediate chamber rises. Accordingly, the brake fluid in the intermediate chamber is leaked through the second seal part to the outside.

Although the axial displacement of the sealing member 41 is not significantly large, the pressure rising in the intermediate chamber becomes significant as accumulation amount of the brake fluid introduced into the intermediate chamber increases. As a result, even if the axial displacement is very small, there is a problem that an inner pressure of the intermediate chamber exceeds the sealing pressure of the oil seal. At this time, the brake fluid in the intermediate chamber can be leaked to the outside.

Further, due to the axial displacement of the sealing member 41, the brake hydraulic pressure generated in the master cylinder can be wasted to no purpose. The suction chamber of the pump is connected to a reservoir via a cut valve and a master pressure chamber of the master cylinder so as to allow the pump to suction the liquid in the reservoir when the master cylinder is in inactive state. As the cut valve is closed by the hydraulic pressure which is generated in the master cylinder, the connection between the suction chamber and the reservoir is broken. Even in this case, the hydraulic pressure of the master cylinder flows into the suction chamber until the cut valve is closed. At this time, when the sealing member 41 displaces axially and the volume of the suction chamber increases, the liquid measure flowing from the master cylinder into the suction chamber increases. As a result, the pressure rising property of the master cylinder is deteriorated.

The present invention has been made to solve the above-described problem and it is an object of the present invention to prevent the axial displacement of the sealing member using a force which is generated as the sealing member of the shaft sealing apparatus is dragged by a rotatable member and rotates relative to a not-rotatable member.

A first aspect of the disclosure provides a shaft sealing device comprising:
a first member;
a second member provided with a through-hole through which the first member passes, the second member capable of moving relative to the first member;
a sealing member configured to seal a gap between an inner peripheral surface of the through-hole and an outer peripheral surface of the first member and capable of rotating relative to the inner peripheral surface and the outer peripheral surface;
a rotation restricting part configured to restrict relative rotation between one of the first member and the second member and the sealing member; and
an axial displacement restricting part configured to restrict the axial displacement of the sealing member,
wherein the rotation restricting part includes a first contact portion which is provided on one of the first member and the second member, a second contact portion which is provided on the sealing member and an inclined surface which is included on at least one of the first contact portion and the second contact portion and is inclined to allow surface displacement in both circumferential and axial directions,
wherein the axial displacement restricting part includes a stopper surface which is provided on at least one of the first member and the second member, and
wherein when the sealing member rotates in one direction relative to one of the first member and the second member by being dragged by the other of the first member and the second member, the first contact portion and the second contact portion are brought into contact with each other by the inclined surface so that the sealing member contacts the stopper surface to restrict the axial displacement of the sealing member.

A second aspect provides the shaft sealing apparatus according to the first aspect, wherein
the second contact portion is provided with the inclined surface which the first contact portion contacts,
the incline angle of the inclined surface with respect to the direction of relative rotation between the first member and the second member becomes smaller toward the stopper surface, and
in a position where the sealing member is brought into contact with the stopper surface, the first contact portion and the second contact portion are brought into contact with each other at a region in which the incline angle of the inclined surface is large.

A third aspect provides a pump apparatus comprising:
a power driven pump configured to pump up a liquid;
a first liquid chamber communicating with a suction mouth of the pump;

a second liquid chamber disposed adjacent to the first liquid chamber;

a first partition wall configured to partition the first liquid chamber and the second liquid chamber;

a second partition wall configured to partition the second liquid chamber from outside;

a rotation shaft configured to drive the power driven pump and passing through both the second partition wall and the first partition wall; and the shaft sealing apparatus according to the first aspect, wherein the shaft sealing apparatus is disposed between and seals a gap between the first partition wall constituted as the second member and the rotation shaft constituted as the first member to form a first seal part, and wherein a second seal part is provided between and seals a gap between the second partition wall and the rotation shaft.

A fourth aspect provides a brake hydraulic pressure control device comprising:

a master cylinder configured to generate a hydraulic pressure corresponding to a brake operation in a master hydraulic pressure chamber and to supply the hydraulic pressure to a wheel cylinder;

a reservoir which is communicated with the master hydraulic pressure chamber when the master cylinder is in an inactive state;

an electronic control device configured to determine whether a control for the braking force is required or not based on vehicle behavior information from various sensors; and a hydraulic pressure control unit including a power driven pump and configured to increase, decrease and maintain a hydraulic pressure of the wheel cylinder based on commands transmitted from the electronic control device, wherein a suction chamber which is communicated with an intake port of the power driven pump is connected with the reservoir via the master hydraulic pressure chamber, wherein the brake hydraulic pressure control device includes the suction chamber; an intermediate chamber disposed adjacent to the suction chamber; a first partition wall including the stopper surface and configured to partition the suction chamber and the intermediate chamber; a second partition wall configured to partition the intermediate chamber from outside; a rotation shaft configured to drive the power driven pump and passing through both the second partition wall and the first partition wall; and the shaft sealing apparatus according to the first aspect, wherein the shaft sealing apparatus is located in a region which is closer to the suction chamber than the stopper surface, and is disposed between and seals a gap between the first partition wall constituted as the second member and the rotation shaft constituted as the first member to form a first seal part, and wherein a second seal part is provided between and seals a gap between the second partition wall and the rotation shaft.

In the shaft sealing apparatus of the present invention, although the sealing member is dragged by one of the first member and the second member and thus relative rotation between the sealing member and the other of the first member and the second member is generated, this relative rotation can be prevented by contact of the first contact portion and the second contact portion. At this time, since the first contact portion and the second contact portion are brought into contact with each other at a position of the inclined surface, an axial component force is generated in the contact area of the first contact portion and the second contact portion to axially urge the sealing member toward the stopper surface.

By doing so, the sealing member is pressed against the stopper surface and this state is maintained by relative rotation between the first member and the second member. Further, even if the relative rotation between the first member and the second member is stopped, the sealing member is retained in a contact point with the stopper surface by frictional resistance generated between the sealing member and surface to be sealed and thus the axial displacement of the sealing member is eliminated. As a result, the problem due to the axial displacement can be solved.

Meanwhile, the incline angle of the inclined surface becomes smaller toward the stopper surface, and in a position where the sealing member is brought into contact with the stopper surface, the first contact portion and the second contact portion are brought into contact with each other at a region in which the incline angle of the inclined surface is large. Accordingly, since the incline angle of the inclined surface becomes large at a contact position where the sealing member is brought into contact with the second contact portion, it is possible to relieve the axial urging force due to an action of the inclined surface.

In a case where the contact force of the sealing member and the stopper surface is too large, as the rotation shaft is shaken, the sealing member and the stopper surface radially move relative to each other to cause abrasion or the rotation resistance of the rotation shaft related to the relative rotation in a radial direction increases. As a countermeasure to such a problem, it is preferred to reduce the force applied on the sealing member as far as possible. By changing the angle of the inclined surface, a satisfactory result can be achieved.

In the pump apparatus of the present invention, the axial displacement of the shaft sealing apparatus constituting a first seal part is not caused. Accordingly, the volume of the second liquid chamber disposed between the first seal part and the second seal part is not varied. As a result, the leakage of the brake fluid from the second liquid chamber to the outside is hardly caused, which leakage is a cause for pressure rising of the second liquid chamber.

Further, in the brake hydraulic pressure control device of the present invention, since the axial displacement of the shaft sealing apparatus constituting the first seal part is prevented, the volume of the suction chamber of the pump does not increase and deterioration in the pressure rising property of the master cylinder can be suppressed. In addition, it is also possible to prevent the brake fluid collected in the intermediate chamber from being leaked from the second seal part.

BRIEF DESCRIPTION OF DRAWINGS

FIG. 7A is a view illustrating an example where the inclined surface is provided at a side surface of a groove.

FIG. 7B is a sectional view taken along line X-X of FIG. 7A.

DESCRIPTION OF EXEMPLARY EMBODIMENTS

Figure 1A:
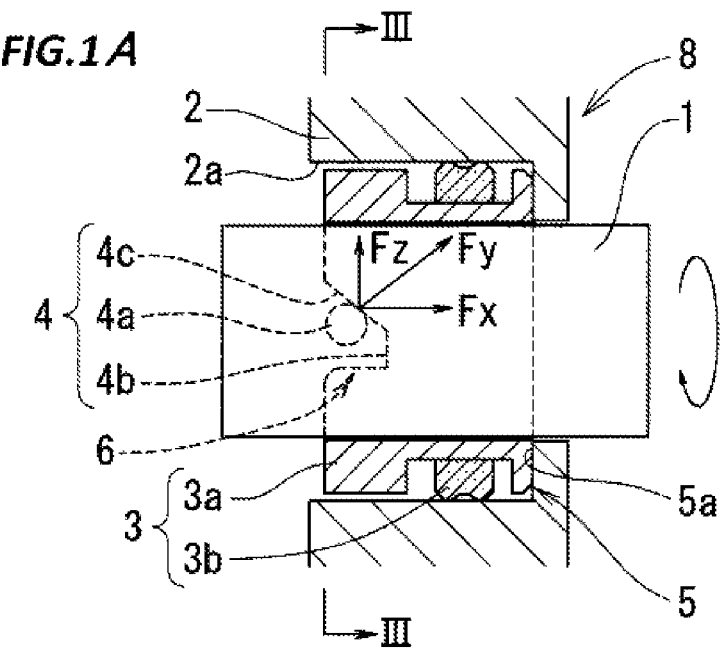
FIG. 1A is a sectional view schematically illustrating as an example a shaft sealing apparatus according to the present invention.

Hereinafter, a shaft sealing apparatus, a pump apparatus and a brake hydraulic pressure control device according to the exemplary embodiment will be described in detail with reference to the accompanying drawings. FIGS. 1A to 3 illustrate an example of the shaft sealing apparatus. The shaft sealing apparatus 8 includes a first member 1, a second member 2, a sealing member 3, a rotation restricting part 4 configured to restrict a rotation of the sealing member and an axial movement restricting part 5 configured to restrict the axial movement of the sealing member.

The second member 2 is provided with a through-hole (a shaft hole) 2a through which the first member 1 passes, and thus the first member and the second member are adapted to rotate relative to each other. The first member 1 of the shaft sealing apparatus illustrated is a rotation shaft and the second member 2 cannot rotate.

The sealing member 3 includes a sliding seal material 3a which is made of low-frictional member, for example, fluorinated resin such as PTFE and a rubber seal 3b but is not limited to such a configuration. It is also considered that the sealing member is entirely formed from same material.

The sealing member 3 is configured to seal a gap between the inner peripheral of the through-hole 2a and the outer peripheral surface of the first member 1. The sealing member 3 is allowed to rotate relative to the inner peripheral of the through-hole 2a and the outer peripheral surface of the first member 1. In addition, as the first member 1 rotates, the sealing member 3 is dragged by the first member 1 and tries to rotate. That is, the sealing member performs so-called co-rotation with the first member. By such a co-rotation, the second non-rotatable member 2 and the sealing member 3 rotate relative to each other.

The rotation restricting part 4 restricts the relative rotation between the sealing member 3 and the second member 2 in a limited range. The rotation restricting part 4 includes a first contact portion 4a which is provided at the non-rotatable member (i.e., the second member 2 in drawings), a second contact portion 4b which is provided on the sliding seal material 3a of the sealing member 3 and an inclined surface 4c which is included on any one of the first contact portion 4a and the second contact portion 4b. For example, in the FIG. 2, the inclined surface 4c is included in the second contact portion 4b.

Further, the axial movement restricting part 5 is provided with a stopper surface 5a which supports the sealing member 3 on the second non-rotatable member 2.

The inclined surface 4c of the rotation restricting part 4 is inclined to allow surface displacement in both circumferential direction (relative rotation direction of the second member 2 and the sealing member 3) and axial direction.

In the shaft sealing apparatus 8 illustrated, the sealing member 3 is disposed on the outer periphery of the first member 1 and interposed between the inner peripheral surface and the outer periphery of the first member. The rubber seal 3b has a tightening margin. By this tightening margin, surface pressure is generate between the sliding seal material 3b and the first member (rotation shaft), and between the sliding seal material 3b and the rubber seal 3b, and between the rubber seal 3b and the inner peripheral surface of the through-hole 2a. Accordingly, a gap between the inner peripheral surface of the through-hole 2a and the outer peripheral surface of the first member 1 is sealed and the shaking of the shaft during the rotation of the first member 1 is also suppressed.

Figure 3:
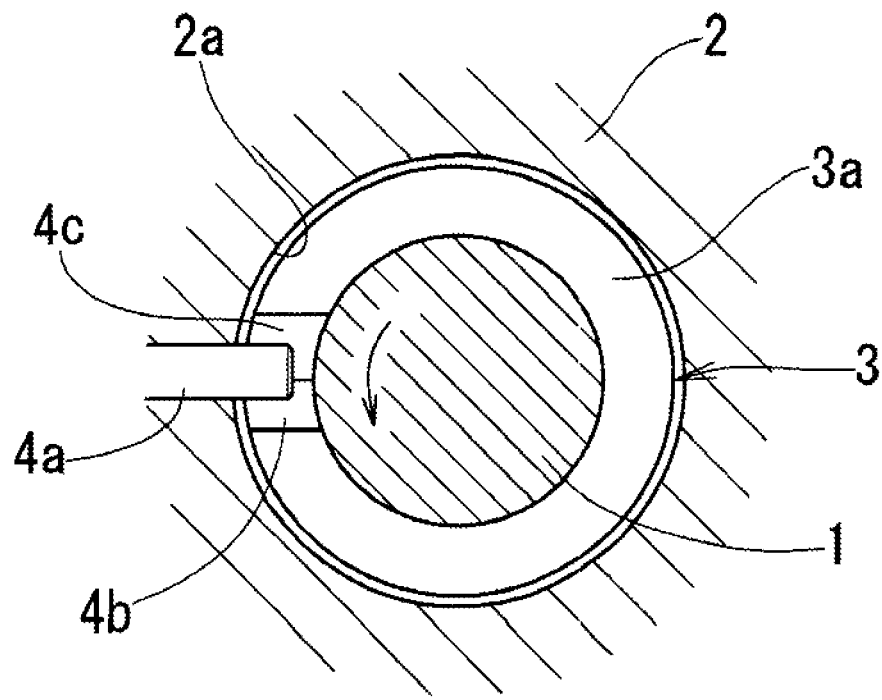
FIG. 3 is a sectional view taken along line III-III of FIG. 1A.

Further, when the first member 1 rotates in a direction of the arrow in FIG. 3, the sealing member 3 is dragged by the first member and tries to rotate. At this time, the rotation force of the first member is applied on the contact point of the first contact portion 4a and the second contact portion 4b. The first contact portion 4a and the second contact portion 4b are brought into contact with each other in a position of the inclined surface 4c. And, an axial component force (Fx in FIG. 1A) of a force due to the rotation of the first member is applied on the contact point and urges the sealing member 3 against the stopper surface 5a to prevent the axial displacement of the sealing member.

Meanwhile, the component force (Fx) is not occurred when the rotation of the first member 1 is stopped. In this state, even if a pressure which acts in a direction opposite to the component force is applied on the sealing member, the sealing member 3 is retained in the contact position with the stopper surface 5a by a frictional force between the sealing member and surface to be sealed. Accordingly, even if the first member 1 repeatedly rotates and stops, the sealing member 3 dose not displace in the axial direction.

Figure 4:
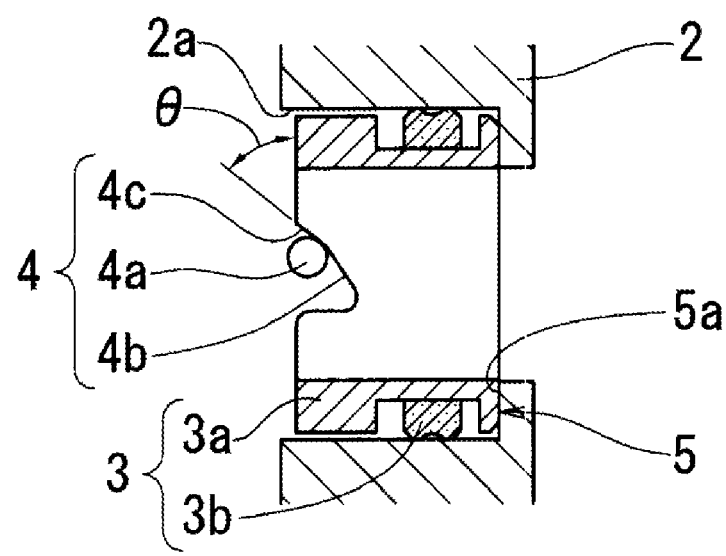
FIG. 4 is a sectional view illustrating a modification of the inclined surface which is provided in the shaft sealing apparatus according to the present invention.

Meanwhile, the incline angle θ of the inclined surface 4c with respect to the direction of relative rotation between the first member 1 and the second member 2 may be instantly set. However, in order to reduce the contact force of a portion of the sealing member 3 which is urged against the stopper surface 5a, it is preferred to set the incline angle θ to be smaller toward the stopper surface (5a), as illustrated in FIG. 4.

Since, in a position where the sealing member 3 is brought into contact with the stopper surface 5a, the first contact portion 4a and the second contact portion 4b are brought into contact with each other at a region in which the incline angle θ of the inclined surface 4c is large, it is possible to reduce the urging force (contact force) applied on the stopper surface 5a.

Figure 5:
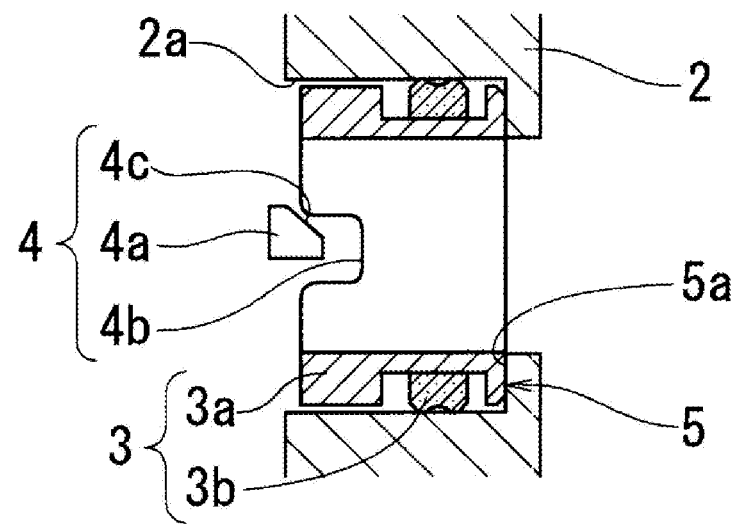
FIG. 5 is view illustrating an example where the inclined surface which the first contact portion and the second contact portion are brought contact with is provided on a non-rotatable member.

FIG. 5 illustrates an example where the inclined surface 4c is provided on the first contact portion 4a. As such, the inclined surface 4c may be provided on the non-rotatable member. Alternatively, the inclined surface 4c may be provided on both the first contact portion 4a and the second contact portion 4b. Further, the first contact portion 4a may have any other shape, in place of the pin in FIG. 1A or the projected element in FIG. 5.

Figure 6:
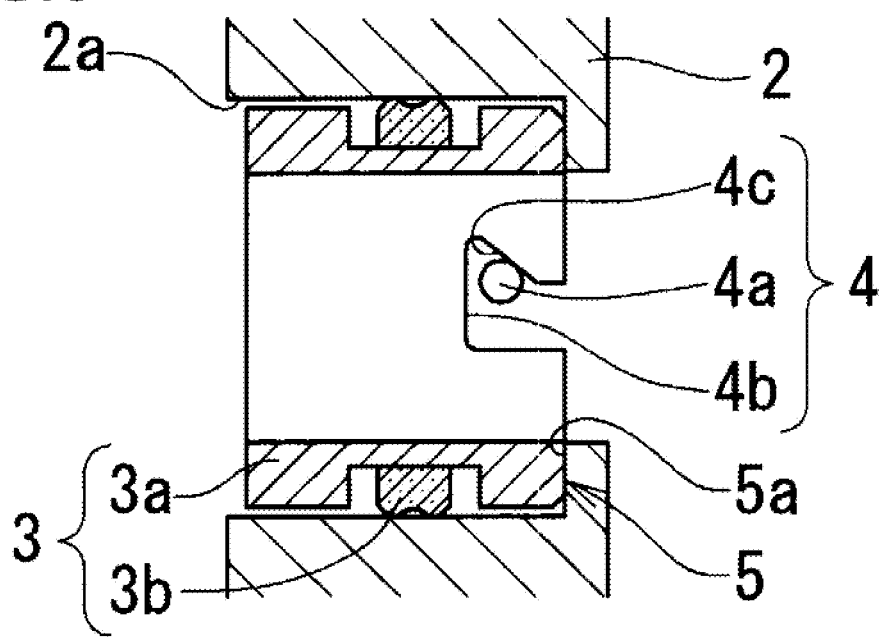
FIG. 6 is a view illustrating an example where the formation position of the inclined surface which the first contact portion and the second contact portion are brought contact with is varied.

The rotation restricting part 4 may be provided on a side of the sealing member 3 which is supported on the stopper surface 5a, as illustrated in FIG. 6, or may be provided on an intermediate portion of the sealing member 3. Further, although a notch portion 6 is provided on the sealing member 3 and the inclined surface 4c is formed on the notch portion in FIG. 1A, it is also possible that a groove 7 is formed on the outer periphery of the sealing member 3 and a portion of the side surface erected from the bottom surface of the groove constituted as the inclined surface 4c, as illustrated in FIGS. 7A and 7B.

In a configuration that the first member 1 is fixed and the second member 2 rotates, the rotation restricting part 4 is arranged between the first member 1 and the sealing member 3.

Next, the pump apparatus will be described with reference to FIGS. 8 to 10. The pump apparatus illustrated in FIG. 10 includes a housing 11 in which a rotation shaft 12, a pump 13 driven by the rotation shaft, a first liquid chamber 14 communicated with a suction mouth of the pump and a second liquid chamber 15 adjacent to the first liquid chamber are installed.

Further, within the housing 11, a first partition wall 16 partitioning the first liquid chamber 14 and the second liquid chamber 15, a second partition wall 17 partitioning the second liquid chamber 15 from the outside, a first seal part 18 sealing a gap between the outer peripheral surface of the rotation shaft 12 and the inner peripheral surface of the first partition wall 16, and a second seal part 19 sealing the outer peripheral surface of the rotation shaft 12 and the inner peripheral surface of the second partition wall 17 are provided.

Plural regions of the rotation shaft 12 are supported on the bearing 20. In addition, the rotation shaft 12 passes through both the first partition wall 16 and the second partition wall 17 to be placed in the housing 11.

Figure 8:
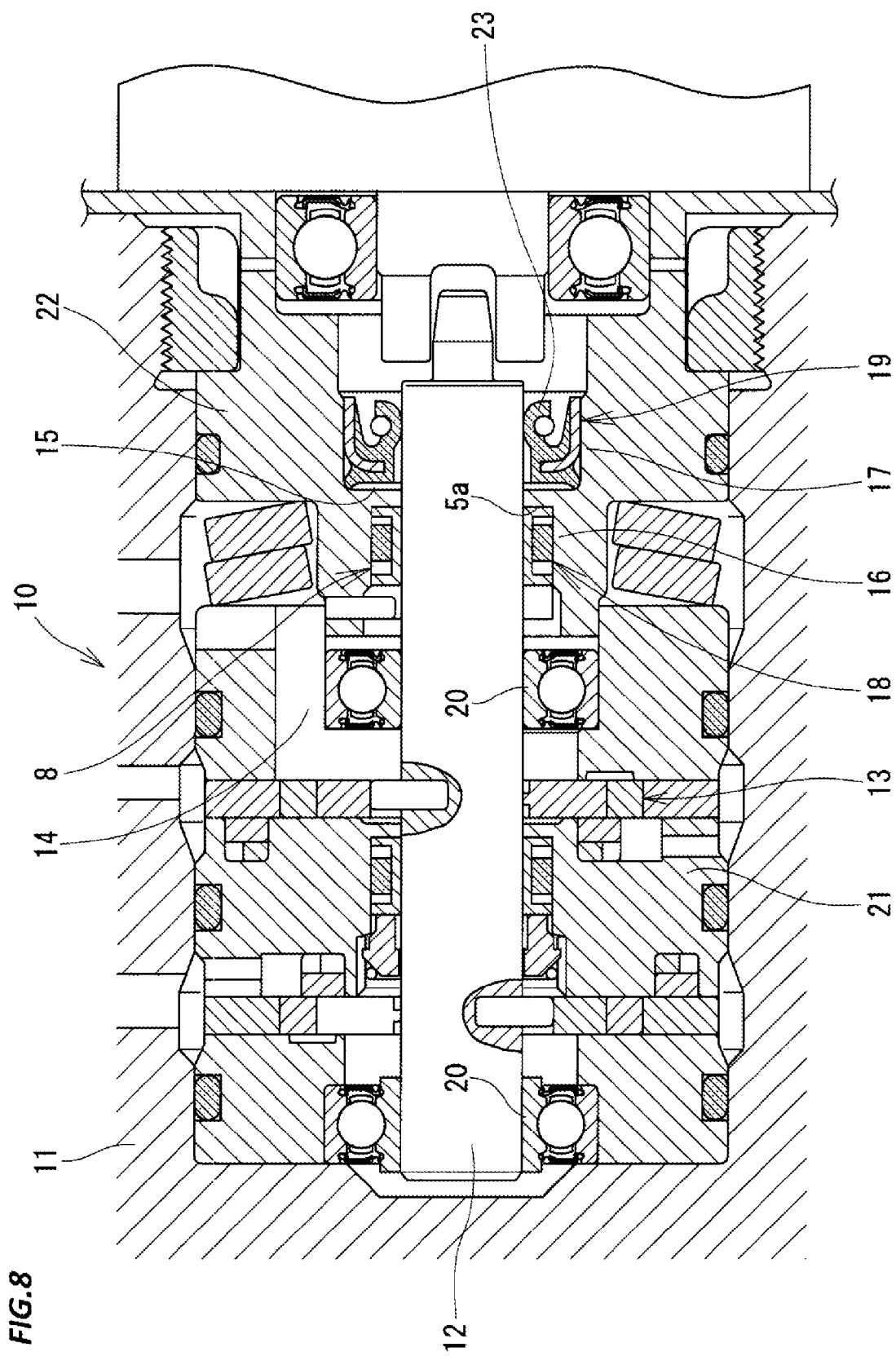
FIG. 8 is a sectional view schematically illustrating an example of a pump apparatus according to the present invention.
Figure 10:
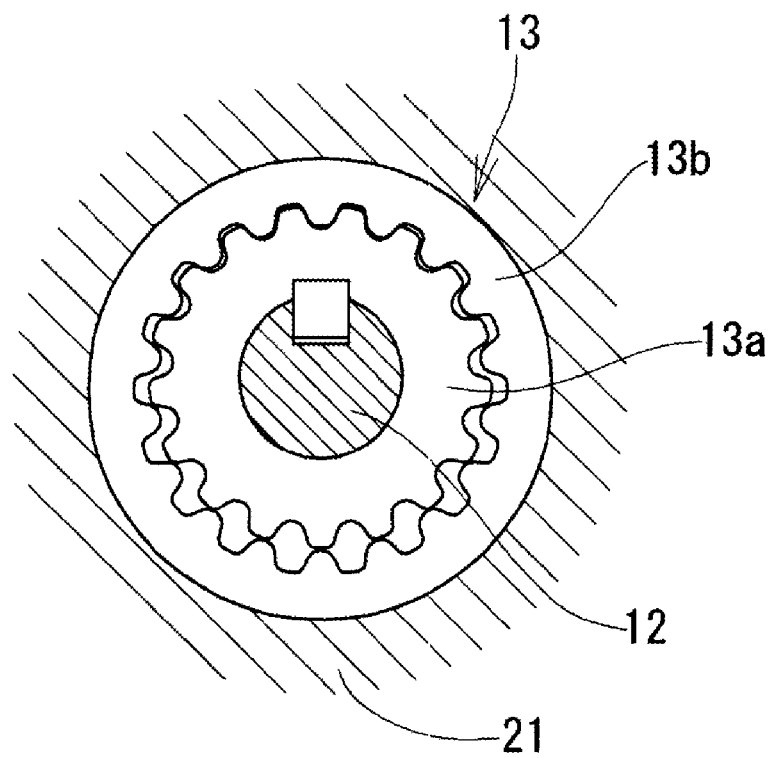
FIG. 10 is a sectional view illustrating an example of an inner gear pump installed in the pump apparatus of FIG. 8.

The pump 13 is constituted as an inner gear pump illustrated in FIGS. 8 and 10. The inner gear pump 13 is a conventional pump in which an inner rotor 13a and an outer rotor 13b are combined in an eccentric arrangement. Teeth difference between the inner rotor 13a and the outer rotor 13b is one. The inner rotor is rotationally driven by the rotation shaft 12. At this time, the outer rotor 13b is rotated and the volume of the pump room (pumping chamber) provided between both rotors 13a, 13b increases so that a fluid can be suctioned and discharged.

In the above pump 13, the inner rotor 13a and the outer rotor 13b are incorporated into a casing 21 to form a pump unit. The pump unit is inserted into the accommodation chamber of the housing 11 and then the entrance of the accommodation chamber is closed by a plug 22 so that the pump unit is incorporated in the housing 11.

The first liquid chamber 14 is formed between the casing 21 and the plug 22. In addition, the second liquid chamber 15 is formed on a side opposite to the first liquid chamber 14 with respect to the first partition wall 16 which includes a stopper surface 5a on its side toward the first liquid chamber 14.

The first liquid chamber 16 and the second liquid chamber 17 are constituted as a part of the plug 22. A gap between the outer peripheral surface of the rotation shaft 12 and the inner peripheral surface of the first partition wall 16 is sealed by the first seal part 18 and a gap between the outer peripheral surface of the rotation shaft 12 and the inner peripheral surface of the first partition wall 17 is sealed by the second seal part 19.

Figure 9:
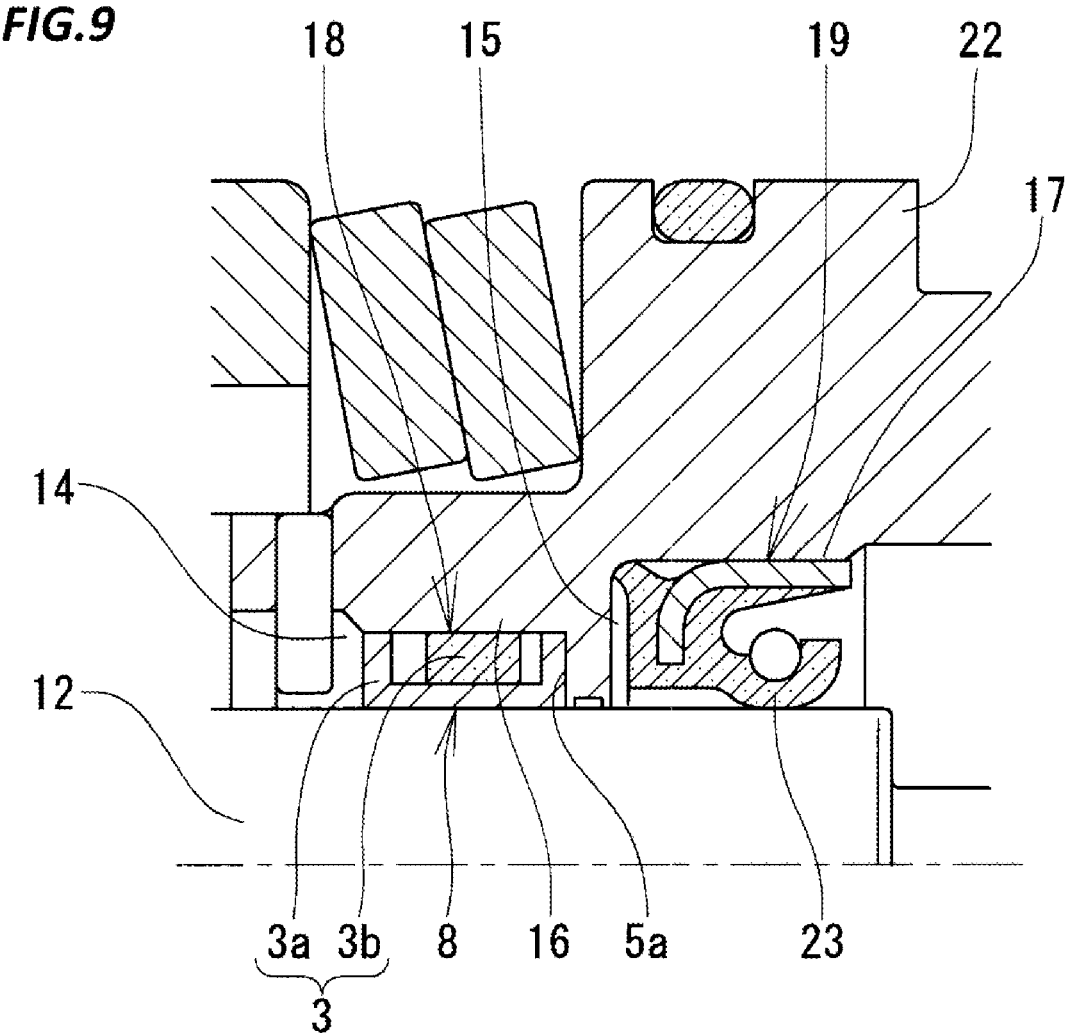
FIG. 9 is a magnified sectional view illustrating main feature of the pump apparatus of FIG. 8.

The first seal part 18 is constituted by the shaft sealing apparatus and the second seal part 19 is constituted by the oil seal 23 (see FIG. 9).

Figure 1B:
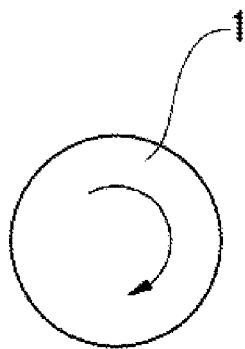
FIG. 1B is a view illustrating a rotation direction of the shaft sealing apparatus of FIG. 1A, as viewed from the right side of FIG. 1A.
Figure 2:
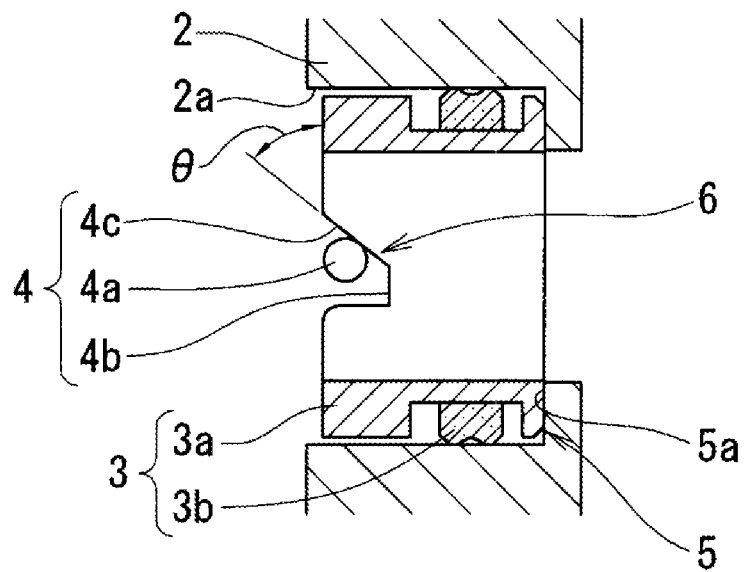
FIG. 2 is a sectional view illustrating the shaft sealing apparatus of FIG. 1A in a state where a first member (a rotation shaft) is omitted.

The shaft sealing apparatus 8 which is explained by referring FIG. 1 is provided. Herein, the rotation shaft 12 is constituted as the first member 1, the plug 22 is constituted as the second member 2, and the shaft sealing apparatus 8 of FIG. 1 is arranged between the first liquid chamber 14 and the second liquid chamber 15 to form a first seal part 18.

Although not illustrated, the shaft sealing apparatus 8 employs a sealing member that includes a sliding seal material and a rubber seal. The inclined surface is provided on any one of the first contact portion and the second contact portion, and the relative rotation between the sealing member 3 dragged by and co-rotating with the driving shaft and the plug 22 is generated to allow the sealing member 3 to be urged against the stopper surface 5a.

Figure 11:
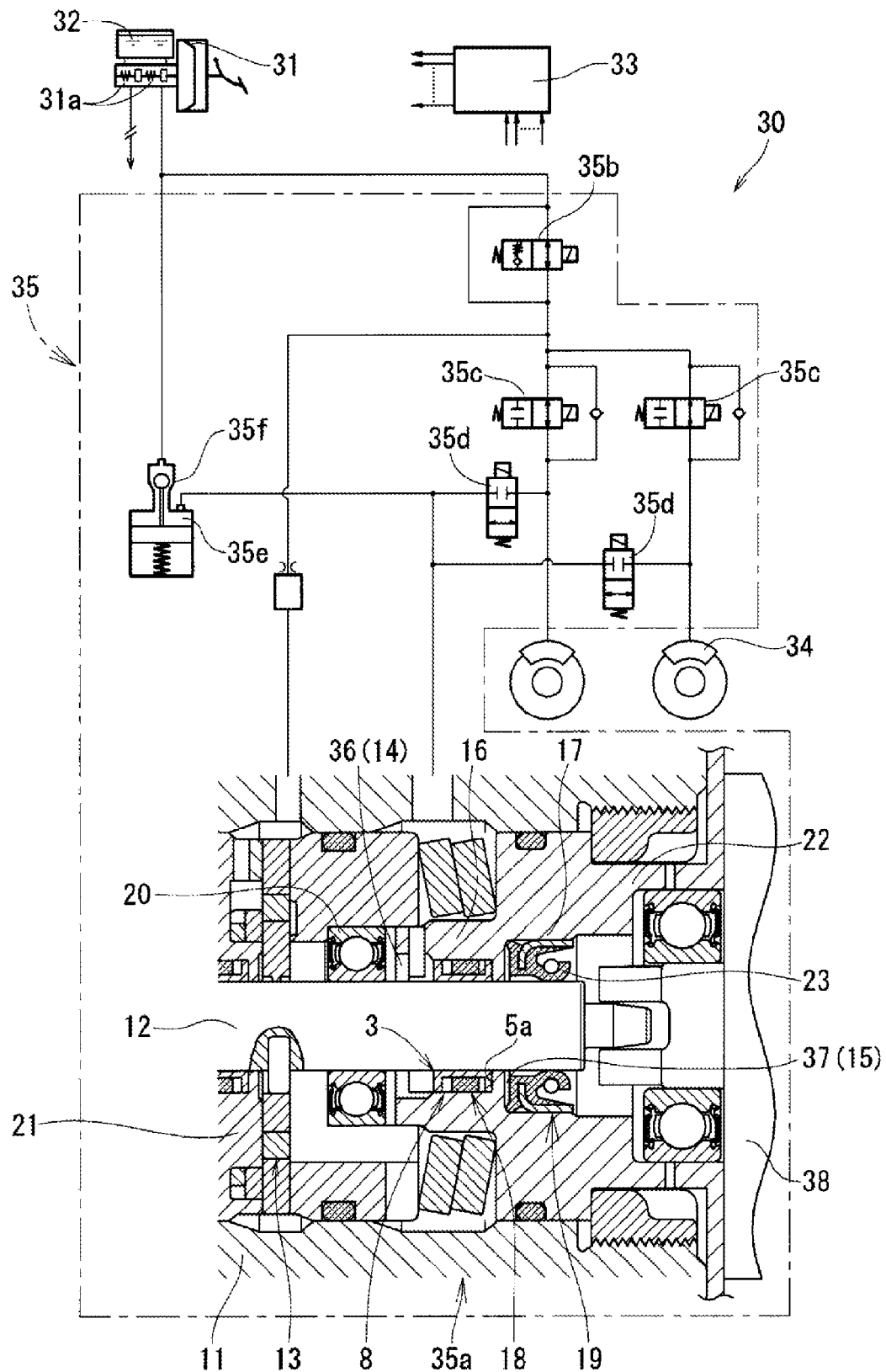
FIG. 11 is a sectional view schematically illustrating an example of a brake hydraulic pressure control device according to the present invention.
Figure 12:
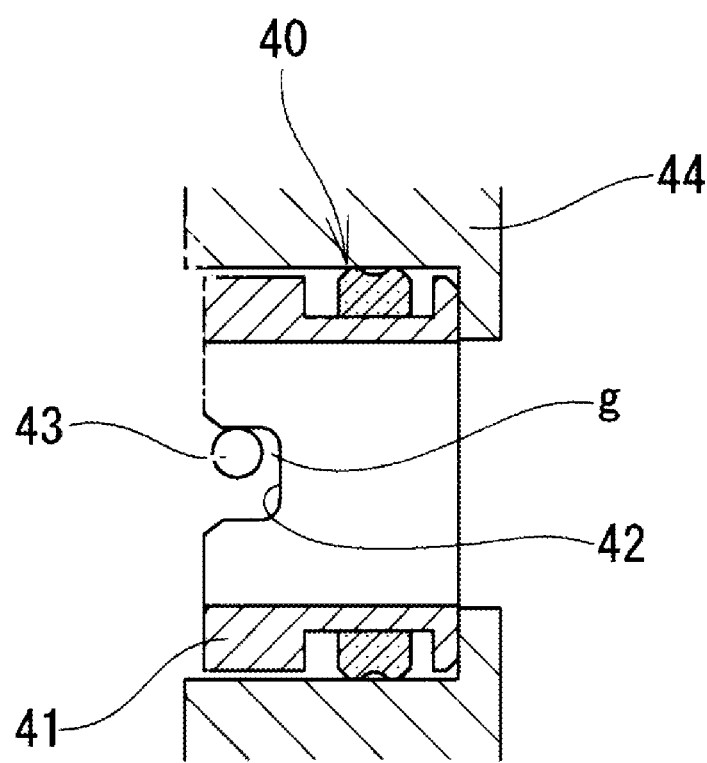
FIG. 12 is a view illustrating a rotation locking structure of a sealing member in a conventional shaft sealing apparatus.

FIG. 11 is a sectional view schematically illustrating an example of a brake hydraulic pressure control device. The brake hydraulic pressure control device 30 includes a master cylinder 31, a reservoir 32 which is communicated with master hydraulic pressure chamber 31a of the master cylinder when the master cylinder 31 is in an inactive state, a electronic control device 33 configured to determine whether a control for the braking force is required or not based on vehicle behavior information input from various sensors (not illustrated) such as wheel speed sensor, a deceleration sensor, or a yaw sensor, and a hydraulic pressure control unit 35 configured to increase, decrease and maintain a hydraulic pressure of the wheel cylinder 34 based on commands transmitted from the electronic control device 33.

The master cylinder 31 generates a hydraulic pressure corresponding to an operation amount of the brake operation member (generally, brake pedal). The hydraulic pressure is supplied to the wheel cylinder 34 to impart a brake force corresponding to the operation amount on the vehicle wheel.

The hydraulic pressure control unit 35 includes a pump 35a driven by the motor 38. For example, the hydraulic pressure control unit 35 has a configuration that the pump 35a, a linear differential pressure control valve 35b, a pressure increasing electro-magnetic valve 35c, a pressure reducing electro-magnetic valve 35d, a low-pressure liquid reservoir 35e which temporarily accumulates the brake fluid discharged from the wheel cylinder 34, and a cut valve 35f which is placed in a path connecting the intake port of the pump 35a to the reservoir 32 via the master hydraulic pressure chamber 31a and which is closed by the hydraulic pressure generated in the master hydraulic pressure chamber 31a are combined. However, the hydraulic pressure control unit 35 is not limited to such a configuration.

The pump 35a has the same configuration as the pump apparatus illustrated in FIG. 8. Accordingly, the description of the same components will be omitted. In the pump apparatus of FIG. 8, the first liquid chamber 14 is constituted as a suction chamber 36, the second liquid chamber 15 is constituted as an intermediate chamber 37, and the suction chamber is connected with the reservoir 32 via the cut valve 35f and the master hydraulic pressure chamber 31a.

By this configuration, it is not desirable that the sealing member of the shaft sealing apparatus 8 constituting the first seal part 18 is axially displaced when the pump 35a pump up the brake fluid in the low-pressure liquid reservoir 35e.

Accordingly, as already mentioned above, the first seal part 18 is constituted with the shaft sealing apparatus 8 and the relative rotation between the sealing member 3 dragged by and co-rotating with the driving shaft and the plug 22 is generated to allow the sealing member 3 to be urged against the stopper surface 5a. The second seal part 19 arranged between the intermediate chamber 37 and the outside is constituted by a conventional oil seal.

Meanwhile, although a pump apparatus using an inner gear is explained as an example herein, the pump apparatus according to the exemplary embodiment may be driven by a rotation shaft. The present invention is also applicable to a vane pump or an outer gear pump. Further, the shaft sealing apparatus of the present invention is applicable to an apparatus other than the pump apparatus as long as the apparatus requires a double seal structure to seal a gap formed in an outer periphery of the rotation shaft.

What is claimed is:

1. A shaft sealing device comprising:
a first member;
a second member provided with a through-hole through which the first member passes, the second member capable of moving relative to the first member;
a sealing member configured to seal a gap between an inner peripheral surface of the through-hole and an outer peripheral surface of the first member and capable of rotating relative to the inner peripheral surface and the outer peripheral surface;
a rotation restricting part configured to restrict relative rotation between the second member and the sealing member;
an axial displacement restricting part configured to restrict the axial displacement of the sealing member;
wherein the rotation restricting part includes a first contact portion which is provided on the second member, and a second contact portion which is provided on the sealing member;
wherein the second contact portion includes a groove configured to receive the first contact portion, the groove including an inclined surface which is inclined to allow surface displacement in both circumferential and axial directions;
wherein the first contact portion includes a cylindrical member possessing a central axis extending in a direction perpendicular to a central axis of the through-hole of the second member;
wherein the axial displacement restricting part includes a stopper surface which is provided on at least one of the first member and the second member; and
wherein when the sealing member is rotated in one direction relative to the second member and is dragged by the first member, an outer periphery of the cylindrical member of the second member is abutted against the inclined surface of the sealing member so that the sealing member contacts the stopper surface to restrict the axial displacement of the sealing member, and the sealing member receives an urging force in the axial direction.

2. The shaft sealing apparatus according to claim 1, wherein
the second contact portion is provided with the inclined surface which the first contact portion contacts,
the incline angle of the inclined surface with respect to the direction of relative rotation between the first member and the second member becomes smaller toward the stopper surface, and
in a position where the sealing member is brought into contact with the stopper surface, the first contact portion and the second contact portion are brought into contact with each other at a region in which the incline angle of the inclined surface is large.

3. A pump apparatus comprising:
a power driven pump configured to pump up a liquid;
a first liquid chamber communicating with a suction mouth of the pump;
a second liquid chamber disposed adjacent to the first liquid chamber;
a first partition wall configured to partition the first liquid chamber and the second liquid chamber;
a second partition wall configured to partition the second liquid chamber from outside;
a rotation shaft configured to drive the power driven pump and passing through both the second partition wall and the first partition wall; and
the shaft sealing apparatus according to claim 1,
wherein the shaft sealing apparatus is disposed between and seals a gap between the first partition wall constituted as the second member and the rotation shaft constituted as the first member to form a first seal part, and
wherein a second seal part is provided between and seals a gap between the second partition wall and the rotation shaft.

4. A brake hydraulic pressure control device comprising:
a master cylinder configured to generate a hydraulic pressure corresponding to a brake operation in a master hydraulic pressure chamber and to supply the hydraulic pressure to a wheel cylinder;
a reservoir which is communicated with the master hydraulic pressure chamber when the master cylinder is in an inactive state;
an electronic control device configured to determine whether a control for the braking force is required or not based on vehicle behavior information from various sensors; and
a hydraulic pressure control unit including a power driven pump and configured to increase, decrease and maintain a hydraulic pressure of the wheel cylinder based on commands transmitted from the electronic control device,
wherein a suction chamber which is communicated with an intake port of the power driven pump is connected with the reservoir via the master hydraulic pressure chamber,
wherein the brake hydraulic pressure control device includes the suction chamber; an intermediate chamber disposed adjacent to the suction chamber; a first partition wall including the stopper surface and configured to partition the suction chamber and the intermediate chamber; a second partition wall configured to partition the intermediate chamber from outside; a rotation shaft configured to drive the power driven pump and passing through both the second partition wall and the first partition wall; and the shaft sealing apparatus according to claim 1,
wherein the shaft sealing apparatus is located in a region which is closer to the suction chamber than the stopper surface, and is disposed between and seals a gap between the first partition wall constituted as the second member and the rotation shaft constituted as the first member to form a first seal part, and
wherein a second seal part is provided between and seals a gap between the second partition wall and the rotation shaft.

5. A shaft sealing device comprising:
a first member;
a second member that includes a through-hole through which the first member passes, the second member movable relative to the first member;
a sealing member configured to seal a gap between an inner peripheral surface of the through-hole and an outer peripheral surface of the first member and rotatable relative to the inner peripheral surface and the outer peripheral surface about an axis of rotation;

a rotation restricting part configured to restrict relative rotation between the sealing member and the second member;

an axial displacement restricting part configured to restrict the axial displacement of the sealing member;

the rotation restricting part including a first contact portion on the second member, and a second contact portion on the sealing member, the second contact portion including a groove configured to receive the first contact portion, the groove including an inclined surface that is inclined with respect to the axis of rotation to allow surface displacement in both circumferential and axial directions;

wherein the first contact portion includes a cylindrical member possessing a central axis extending in a direction perpendicular to a central axis of the through-hole of the second member;

the axial displacement restricting part including a stopper surface on at least one of the first member and the second member; and the first contact portion and the second contact portion configured such that when the sealing member is rotated in one direction relative to the second member and is dragged by the first member, an outer periphery of the cylindrical member of the second member is abutted against the inclined surface of the sealing member to restrict the axial displacement of the sealing member and the sealing member receives an urging force in the axial direction.

* * * * *